April 9, 1963
R. R. BROWN ET AL
ELECTRICAL CONNECTOR
3,085,138
Filed Aug. 13, 1959
2 Sheets-Sheet 1
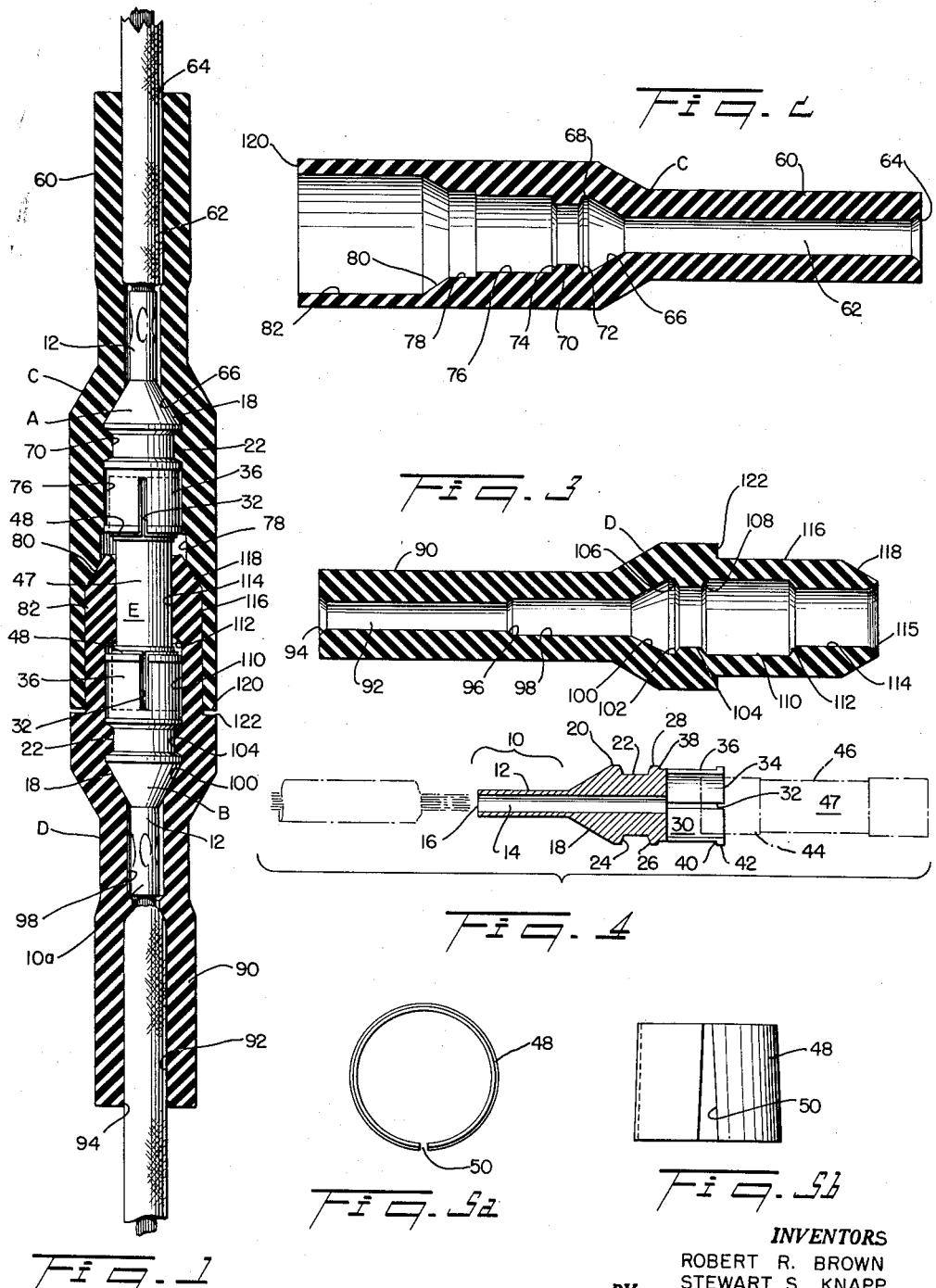
INVENTORS
ROBERT R. BROWN
STEWART S. KNAPP
BY
ATTORNEY

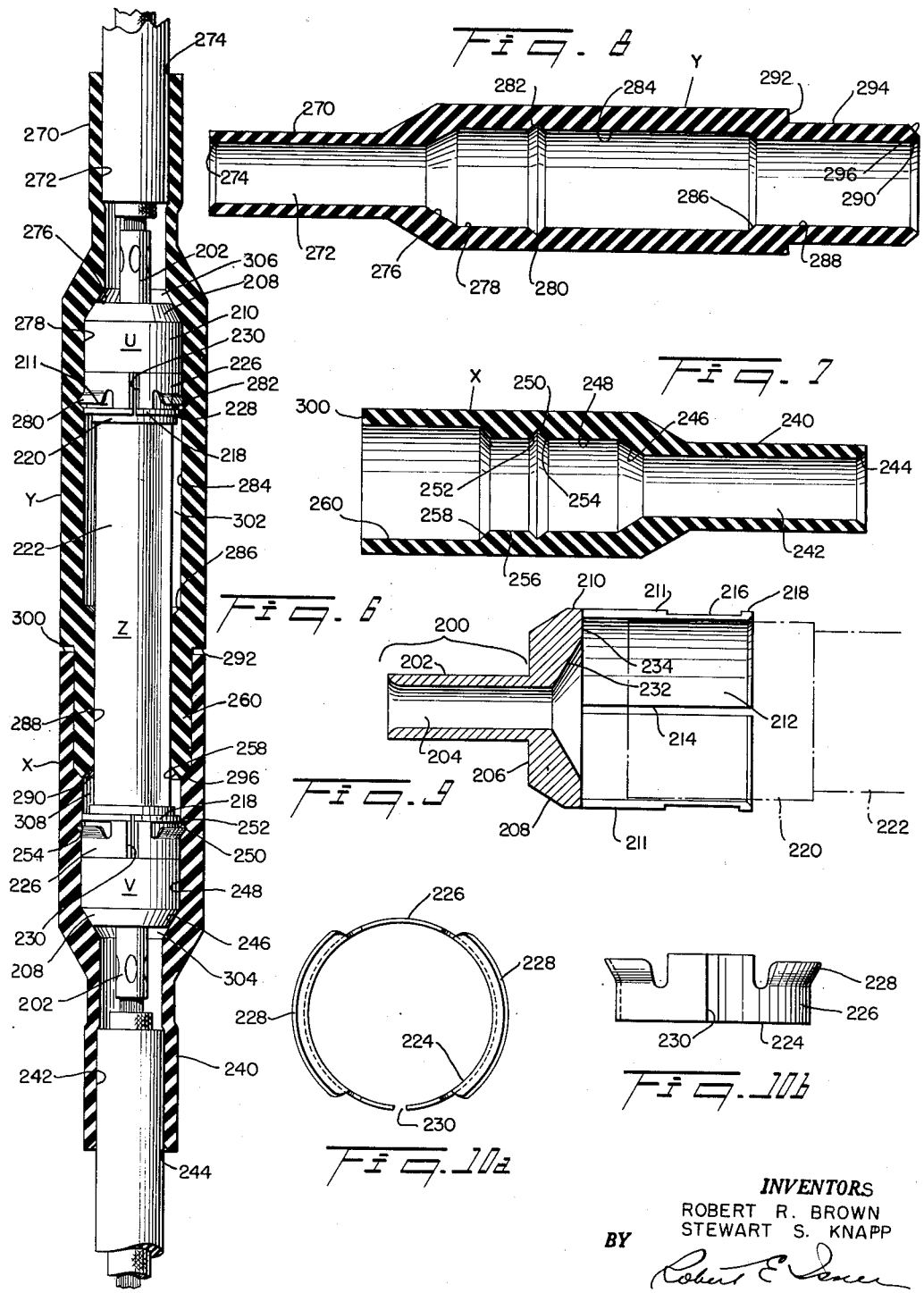

United States Patent Office 3,085,138
Patented Apr. 9, 1963

3,085,138
ELECTRICAL CONNECTOR
Robert R. Brown, Mountainside, and Stewart S. Knapp, Scotch Plains, N.J., assignors to Elastic Stop Nut Corporation of America, Union, N.J., a corporation of New Jersey
Filed Aug. 13, 1959, Ser. No. 833,433
12 Claims. (Cl. 200—115.5)

This invention relates to electrical connections and particularly to an improved construction for field formation of a releasable waterproof electrical connection adapted to integrally contain an electrical instrumentality.

It is highly desirable in the use of electrical cables and particularly in system installations wherein the cable and other components (such as transformers, reactors, motors, potheads, etc.) are buried in the ground, or are exposed to the elements and sunlight or are immersed in fresh or salt water, to be able to conveniently releasably join, both electrically and mechanically, cable ends to each other as well as to other components at locations determined primarily by the more or less unpredictable and variant conditions encountered in the field during installation or repair and to provide in such connections an integral electrical instrumentality, such as a fuse type protective device.

It is well known in this art to provide, during factory manufacture thereof, cable ends and other electrical components with integral connectors which can be releasably plugged together at the time of subsequent installation. However, the facility of interconnection of such factory prefabricated connectors in the field is largely dependent upon the careful predetermination and preselection of proper cable lengths and such units thereby normally lack the necessary degree of flexibility and adaptability required to accommodate the variant operations and conditions that are encountered in field installation and maintenance operations. The problems normally attendent field installation and maintenance have been recognized by those skilled in this art and various proposals have been made in an attempt to overcome the manifold problems raised by the variant conditions encountered. Expedients, such as the utilization of portable molding equipment or connector constructions that result in the fabrication of a permanent non-releasable connection, are subject to serious disadvantages either as to the original cost thereof, the complexity of structure, the complexity of operations attendent to the field assembly thereof and/or unsatisfactory performance.

An improved structure for an electrical connection assembly that is particularly adapted for field utilization is disclosed in the co-pending application of Robert R. Brown, Serial No. 774,456, filed November 17, 1958, now abandoned. The construction herein disclosed is in the nature of an improvement over that disclosed and claimed in the above identified application and incorporates provision for integral inclusion of an electrical instrumentality in an easily assembled electrical connection of novel and improved character that is particularly adapted for utilization in field installation and maintenance operations.

The object of this invention is the provision of an improved construction for an electrical connection assembly adapted for field utilization.

Another object of this invention is the provision of an improved construction for a releasable waterproof electrical connection that may be readily fabricated and assembled under field conditions and which includes provision for the integral inclusion of an electrical instrumentality intermediate interconnected units.

A further object of this invention is the provision of an improved construction for a releasable waterproof electrical connection that may be readily manually assembled from a minimum number of simple, inexpensive and readily portable component elements under field conditions without the use of special jigs or tools.

Still another object of this invention is the provision of an improved construction for a releasable waterproof electrical connection formed of a plurality of components that may be pre-assembled and pre-packaged in kit form and that readily and simply permits subsequent assembly thereof under field conditions.

Among the advantages of the herein disclosed invention is a permitted ready and simple manual field assembly of an electrical connection of improved character from inexpensive and readily portable component elements without utilization of special jigs or tools, the provision of a readily releasable waterproof electrical connection that permits integral inclusion, under field conditions, of an electrical instrumentality therein, such as, for example, a protective fuse, and a permitted pre-assembly and pre-packaging in kit form of all of the component elements necessary to effect the field fabrication of a releasable waterproofed electrical connection of an improved character.

Still other advantages of the herein disclosed invention is the provision of a connector assembly of such character as to provide a substantially vibration-free and shockproof mounting for the electrical instrumentality integrally included therein, and the provision of a connector assembly that readily permits inter-connection of cables of different sizes and character.

Other objects and advantages of the invention will be disclosed in the following specification and claims and illustrated in the accompanying drawings which show, by way of example, the principles underlying this invention together with the presently preferred embodiments of suitable component elements incorporating said principles.

Referring to the drawings:

FIGURE 1 is a vertical sectional view of an assembled electrical connection constructed in accordance with the principles of this invention and incorporating a protective fuse as an example of an electrical instrumentality integrally includable therein.

FIGURE 2 is a vertical sectional view of the connector body receptacle housing shown in FIGURE 1.

FIGURE 3 is a vertical sectional view of the connector body plug housing shown in FIGURE 1.

FIGURE 4 is a sectional view of a socket member adapted to be contained within the connector body receptacle housing of FIGURE 2 and the connector body plug housing of FIGURE 3 as shown in FIGURE 1.

FIGURES 5a and 5b are plan and side elevational views respectively of a socket encircling spring member adapted to be incorporated in the construction of FIGURES 1 through 4.

FIGURE 6 is a vertical sectional view of an assembled electrical connection embodying an alternative construction that incorporates the principles of this invention and again incorporating a protective fuse as an example of an electrical instrumentality integrally includable therein.

FIGURE 7 is a vertical sectional view of the connector body receptacle housing shown in FIGURE 6.

FIGURE 8 is a vertical sectional view of the connector body plug housing shown in FIGURE 6.

FIGURE 9 is a sectional view of a socket member adapted to be contained within the connector body receptacle housing of FIGURE 7 and the connector body plug housing of FIGURE 8 as shown in FIGURE 6.

FIGURES 10a and 10b are plan and side elevational views, respectively, of a socket encircling spring member adapted to be incorporated in the construction of FIGURES 5 through 8.

By way of general introduction, the improved construction forming the subject matter of this invention includes five component elements, i.e. a pair of conducting socket members, generally designated A and B in FIGURE 1, a connector body housing member formed of insulating material for each of said socket members and generally designated C and D and an integrally includable electrical instrumentality, which in the specifically illustrated embodiments is a conventional protective fuse E.

As the following portions of the specification will make clear to those skilled in this art, the hereinafter described configuration of the socket members and their respective housings cooperate to provide a releasable waterproof fused electrical connection of improved character that is easily and simply assembled under field conditions without utilization of special tools or jigs.

FIGURE 4 illustrates the constructional details and the configuration of the conducting socket members, heretofore generally designated A and B. These units are similarly shaped and, in the interests of brevity, the hereinafter set forth description of one of these units will suffice for a description of both, it being clearly understood that a complete structure requires utilization of two of such units. As there shown each socket member is preferably formed of conducting material, suitably copper or copper alloy, and is shaped to provide a cable conductor receiving portion 10 in the form of an elongate malleable tubular wall 12 of uniform external diameter and defining an axially disposed cylindrical bore 14. The bore 14 is preferably sized to receive the bared end of a cable conductor member insertable therein from end 16 and to permit the ready formation of a permanent mechanical and electrical connection therebetween as by manually crimping or otherwise deforming the cable conductor surrounding portions of said wall 12. The cable conductor receiving portion 10 is sized to receive a cable conductor and as such the diametrical extent thereof is preselected for each installation and, depending on the conditions of use, the cable conductor receiving portions 10 of the socket members A and B may be differently sized. The tubular wall portion 12, remote from the cable conductor receiving end 16 thereof, integrally connects with the apex of a frusto-conically shaped tapered portion 18 of progressively increasing external diameter. To facilitate assembly the tapered portion 18 is preferably shaped to have a slope of about 30° from the axis of the bore 14. The base of the tapered portion 18 terminates in a relatively short cylindrical section 20 of uniform external diameter. Disposed immediately adjacent thereto is a retaining rib receiving recess 22 preferably formed with slightly sloping wall portions 24 and 26. A slope of about 15° from a perpendicular to the longitudinal axis of the unit has been found to be satisfactory for the wall portions 24 and 26. The wall portion 26 upwardly terminates in a second short cylindrical section 28 of an external diameter which may conveniently be sized to approximately equal that of the first short cylindrical section 20. Disposed adjacent to the second short cylindrical section 28 is an annularly shaped electrical instrumentality receiving socket portion, generally designated 30, and preferably having the defining cylindrical wall portions 34 thereof provided with a plurality of longitudinally disposed slits 32 to incorporate some degree of radial resilience thereto. As shown in the drawings, the outer surface of the wall members 34 defining the socket portion 30 is provided with a relatively shallow spring receiving recess 36, the longitudinal extent of which extends substantially over the length of the socket portion 30 and is defined at one end by a shoulder 38 which merges with the second short cylindrical portion 28 and at the other end by a shoulder 40 of a terminally positioned third short cylindrical section 42 of an external diameter preferably equivalent to that of said first and second short cylindrical sections 20 and 28, respectively. The second cylindrical section is preferably sized to give the wall 38 sufficient depth to join the recess 36 and to provide a sufficient depth thereof, in conjunction with the shoulder 40, to prevent the hereinafter described spring member 48 from being removed therefrom or "wiped off" during the hereinafter described assembly operations.

As indicated by the dotted lines, the socket portion 30 is adapted to receive and contain the terminal end portion 44 of a protective fuse member 46 of conventional construction. The inside diameter of the annularly shaped socket portion 30 is preferably sized so as to be very slightly larger than the outside diameter of the fuse terminal member 44 so as to assure reception therein of the socket portion of the fuse and a relative snug fit for said terminal 44. Maintenance of a compressive mechanical and electrical engagement between the inner surfaces of the wall members 34 and the inserted portions of the fuse terminal member 44 inserted therein is effected by a slightly tapered spring ring 48 formed of resilient material, suitably beryllium copper. As best shown in FIGURES 5a and 5b the spring ring 48 is of a width and thickness sized to be received in the recess 36, is slightly tapered and is provided with a tapering longitudinal slit 50. When the ring 48 is disposed within the recess 36 with its tapered end disposed adjacent the shoulder 40, the entry aperture of the socket is slightly reduced in diameter, and the necessary spreading thereof and of the spring 48 effected by insertion of the terminal 44 therein, assures maintenance of a compressive mechanical and electrical engagement therebetween.

As shown in FIGURE 1, a socket member of the type illustrated in FIGURE 4 and described above is adapted to be contained within each of the connector body housing members C and D. FIGURE 2 illustrates a preferred construction and configuration of the connector body receptacle housing member C. As there shown, it includes a reduced diameter section in the form of an elongate cable receiving sleeve portion 60 containing an axially disposed bore 62 having a bevelled cable entering end 64. The sleeve portion 60 is preferably of a total length sufficient to contain the cable conductor receiving portion 10 of the heretofore described socket member, a length of insulated cable preferably equal to at least twice the insulated diameter thereof, and an additional length to provide the necessary insulation characteristics for a properly prepared cable. As will be explained in more detail at a later point in this specification, the bore 62 is sized to be slightly smaller than the external diameter of the cable employed so as to result in a distention of the bore 62 by a cable inserted therein and a concomitant formation of a compressive watertight fit between the contiguous surfaces thereof. For convenience, such a fit will hereinafter be termed a "distended fit." The cable receiving bore 62 inwardly terminates in an outwardly flaring frusto-conically shaped section 66 sized to complementally match and receive the complementally shaped tapered portion 18 of the heretofore described socket member. Disposed adjacent the enlarged base of the flared section 66 is a first cylindrically shaped section 68 sized to complementally match and receive the complementally sized and shaped first short cylindrical section 20 of said socket member. Disposed adjacent to the section 68 is an inwardly directed annularly shaped retaining rib 70 having inwardly directed and slightly sloping wall portions 72 and 74. The retaining rib 70 so formed is sized and oriented to complementally match and be retained within the complementally shaped retaining rib receiving recess 22 on said socket member. Disposed adjacent to the above mentioned retaining rib 70 is an enlarged cylindrically shaped bore 76 sized to complementally match and receive the outer surface of the terminal engaging socket assembly, i.e. the annularly shaped socket portion 30 having the spring ring 48 mounted in the recess 36 and a terminal 44 of a protective fuse 46 disposed therewithin. Disposed adjacent to the bore 76 is an enlarged intermediate bore portion 78 of limited longitudinal extent and of a slightly greater internal diameter than the aforementioned bore 76. The intermediate bore 78 terminates in an outwardly flaring frusto-conically shaped section 80 which in turn terminates in an enlarged terminal bore 82. The portions of the housing defining the terminal bore 82 and the tapered section 80 disposed inwardly adjacent thereto cooperate to form a plug receiving receptacle adapted to compressively receive and contain a complementally shaped plug portion of the hereinafter described connector body housing member D.

FIGURE 3 illustrates the preferred construction of the connector body plug housing member D. As there shown, it includes a reduced diameter section in the form of an elongate cable receiving sleeve portion 90 containing an axially disposed terminal bore 92 having a bevelled cable entering end 94. The bore 92 may, if desired, terminate in a bevelled shoulder 96 defining a second and enlarged bore 98. The enlarged bore 98 may be provided to accommodate an enlarged cable conductor receiving portion 10a of socket member, as heretofore described, in a clearance fit, when different sizes of cables are to be interconnected. Alternatively, the bore 92 may be made larger than the bore 98 to accommodate an enlarged size cable. The terminal bore 92, however, is sized so as to be slightly smaller than the external diameter of the cable employed irrespective of its size, and to result in a "distended fit" with a cable member inserted therein. The sleeve portion 90 is, as illustrated, preferably of a total length sufficient to contain the cable conductor receiving portion 10 of the heretofore described socket member, a length of insulated cable preferably equal to at least twice the insulated diameter thereof and an additional length to provide the necessary insulation characteristics for a properly prepared cable. The enlarged bore 98 inwardly terminates in an outwardly flaring frusto-conically shaped section 100 sized to complementally match and receive the complementally shaped tapered portion 18 of the heretofore described socket member. Disposed adjacent to the base of the frusto-conically shaped section 100 is a first cylindrically shaped section 102 sized to complementally match and receive and engage the complementally sized and shaped first short cylindrical section 20 of said socket member. Disposed adjacent to the section 102 is an inwardly directed annularly shaped retaining rib 104 having inwardly directed and slightly sloping wall portions 106 and 108. The retaining rib 104 so formed is sized and oriented to be retained in the complementally shaped receiving recess 22 on said socket member. Disposed adjacent to the above mentioned sloping shoulder or wall portion 108 is an enlarged cylindrically shaped bore 110 sized to complementally match and receive in encircling engagement the outer surface of the terminal engaging socket assembly, i.e. the annularly shaped socket portion 30 having the spring ring 48 mounted in the recess 36 and a terminal 44 of a protective fuse 46 disposed therewithin. The above mentioned bore 110 terminates in an inwardly directed frusto-conical portion 112 which, in turn, defines a terminal bore 114 of reduced diameter and which is sized to substantially match the surface of the body portion 47 of a fuse member 46 having its terminal end portion 44 mounted in the terminal receiving socket portion 30, and thereby permit said fuse member to serve as a rigid bore filling base for the hereinafter described plug portion of said housing member. Preferably the end portion of the terminal bore 114 is bevelled as at 115 to facilitate article entry therein.

The portions of the housing member D containing the bores 110 and 114 is externally shaped and sized to form a plug portion adapted to be received within the receptacle forming portions of the connector body receptacle housing member C. In the illustrated embodiment the plug portion is formed with a terminating shoulder 122, a reduced diameter body portion 116, and a tapered terminal portion 118 sized and shaped so as to complementally be received within the terminal bore 82 and tapered section 80 of said housing member C. Specifically the outer diameter of the body portion 116 is made slightly greater than the inner diameter of the receiving bore 82 so as to provide a "distended fit" therebetween, when said plug portion is inserted into said receptacle portion with its concomitant compressive engagement between the contiguous surfaces and the formation of a waterproof seal therebetween.

The material utilized for the connector body plug and receptacle housings C and D respectively must be resilient and elastic in nature to allow assembly and form the desired waterproof seals and should preferably also be of a readily moldable character to facilitate fabrication thereof. The material should also be non-porous to both gases and liquids; substantially impervious to acids and alkalis of the kind and concentrations ordinarily encountered in earth installations and to the action of the atmosphere, particularly with reference to the sun's rays. It should also be capable of resisting, without adversely affecting its mechanical and electrical properties, extremes of temperature conditions from sub-zero temperatures to the high temperatures that normally would be encountered in above ground installations in tropic or desert locations. Additionally, it should be relatively firm, non-frangible, have a controlled degree of elasticity, the quality of toughness and a relatively high dielectric strength. A class of materials which most satisfactorily meets requirements of the above nature are properly compounded synthetic elastomers of the category generally known as "synthetic rubber" of which the following may be mentioned as examples, possessing the aforesaid properties to a greater or lesser extent: "SBR" (styrene butadiene rubber), a polymeric product of butadiene and styrene; and "neoprene," which is a generic term for a number of chloroprene polymers of different grades and designated as CR plus numerical designations for the several grades thereof. Properly compounded, "neoprene" or "SBR" have proved to be eminently satisfactory and constitute preferred materials.

The above described component elements are individually pre-fabricated and pre-packaged in kit form for use in field installation and repair operations. Assembly of the improved electrical connection, as shown in FIGURE 1, is readily accomplished by the following series of manual operations, none of which require the utilization of special jigs or tools. First, the load side cable end is coated with a lubricant, suitably an insulating jelly such as a silicone compound, and is inserted into the bevelled end 64 of the bore 62 of the connector body receptacle housing C and pushed therethrough until the cable end extends through the bore 82. As indicated above, the diameter of the bore 62 should be smaller than the outside diameter of the insulated portion of the cable; however, the presence of the lubricant and the necessary resilient and elastic character of the material forming the connector body receptacle housing C permits manual insertion of the insulated cable through said housing without undue difficulty. The cable end is then skived or stripped to bare the end portion of the conductor. The adjacent portion of the cable is then properly prepared as by tapering or stepping the insulation to provide for the necessary insulation characteristics in an assembled unit in accordance with the character of the cables involved. The bared conductor is then inserted into the cable conductor receiving bore 16 of a socket member and the malleable wall portion 14 thereof is crimped or otherwise deformed into secure mechanical and electrical engagement therewith. The tapered portion 18 of the socket member is then coated with a small amount of the lubricating jelly and a small amount of such insulating jelly is inserted into the bores 82, 78 and 76 of the housing member. The cable and socket member secured thereto is then drawn and/or pushed into the housing member until the tapered portion 18, recess 22 and socket portion 30 are seated in abutting engagement with the complementally sized and shaped flared portion 66, retaining rib 70 and enlarged bore 76 respectively. When so seated the "distended fit" between the insulated cable and the bore 62 will assure compressive engagement of the abutting surfaces and the provision of a secure watertight seal therebetween.

A similar procedure is followed with the second or line side cable. The insulated portions of the cable end is coated with the lubricating insulating jelly, and inserted into and through the bore 92 of the connector body plus housing D until the lead end thereof extends through the bore 114, after which it is skived or stripped to expose the conductor. The adjacent portions of the cable is then properly prepared as by tapering or stepping the insulation to provide for the necessary insulation characteristics in an assembled unit in accordance with the character of the cables involved. The skived end is then inserted into the cable conducting receiving bore 16 of a socket member and malleable wall portion 14 thereof is crimped or otherwise deformed into secure mechanical and electrical engagement therewith. After coating the tapered portion 18 of the socket member with the lubricating insulating jelly and additionally introducing a small quantity of said jelly into the bores 114 and 110, the cable and socket member secured thereto is drawn and/or pushed into the connector body plug housing member D until the tapered portion 18, recess 22 and socket portion 30 are seated in abutting engagement with the complementally sized and shaped flared portion 100, retaining rib 104 and enlarged bore 110 respectively. When so seated, the "distended fit" between the insulated cable and the bore 92 will assure compressive engagement of the abutting surfaces and the provision of a secure watertight seal therebetween.

With the component elements so assembled, the terminal end portion 44 of an electrical instrumentality, such as a protective fuse 46, is inserted into the terminal receiving socket portion 30 of the socket member now disposed within the connector body receptacle housing C. After insertion of the protective fuse 46 as described above the plug portion of the connector body plug housing D is inserted into the receptacle portion of the connector body receptacle housing C until the tapered portion 80 of the receptacle housing member C is disposed in abutting relationship with the tapered portion 118 on the plug housing member D. It should be noted that the surrounding engagement of the bore 114 of the connector body plug housing member with the body portion of the inserted fuse serves to assure the maintaining of the fuse in the plug portion upon subsequent separation (hence identifying the load side) and additionally, by providing a rigid bore filling base for the plug portions of the connector body plug housing, contributes to a maintenance of pressure on the water seal surfaces 82 and 116 in a connected unit. With the parts so assembled a "distended fit" is provided between the abutting surfaces of the bore 82 and flared portion 80 of the connector body receptacle housing C and the slightly larger sized body portion 116 and tapered portion 118 of the connector body plug housing member D which results in an effective, although releasable, waterproof seal of extended surface area therebetween.

Preferably a layer of pressure sensitive tape is applied around the spaced joint between the assembled housing members to prevent dirt and moisture from getting into the space between the shoulders 120 and 122 and being subsequently drawn into the waterseal surfaces whenever the assembled connection is subsequently separated.

As will be apparent to those skilled in this art, the above disclosed construction is such as to completely attain the above stated objects and advantages of the invention.

FIGURES 6 through 10 illustrate an alternative construction incorporating the principles of this invention.

In general, the illustrated assembly also includes five component elements, i.e. a pair of conducting socket members, generally designated U and V in FIGURE 6, an insulated connector body housing member for each of said socket members, generally designated X and Y and an integrally includable electrical instrumentality, which, in the illustrated embodiment, is a conventional protective fuse Z.

FIGURE 9 illustrates the constructional details and the preferred configuration of the conducting socket members heretofore generally designated U and V. As there shown each socket member is formed of a conducting material, suitably copper or copper alloy, and is shaped to provide a cable conductor receiving portion 200, in the form of a malleable tubular wall 202 defining an axially disposed cylindrical bore 204. The bore 204 is sized to permit insertion of a bared end of a cable conductor member therein and ready formation of a permanent mechanical and electrical connection therebetween, as by manually crimping or by otherwise deforming the cable conductor surrounding portions of said wall 202. The tubular wall portion 202 integrally connects with a vertically disposed annular shoulder 206, the extent of which defines the apex of a frusto-conically shaped tapered portion 208 of progressively increasing external diameter. The enlarged base of the tapered portion 208 terminates in an adjacently disposed cylindrical section 210 of uniform external diameter and which generally defines a terminal receiving socket portion, designated 212. The wall members 211 of the socket portion 212 are provided with a plurality of longitudinally disposed slits 214 to incorporate some degree of radial resilience thereto. The wall portions 211 are also provided with a relatively shallow spring receiving recess 216 defined at one end by a shoulder merging with the cylindrical section 210 and at its terminal end by a shoulder portion 218 of sufficient depth to retain the hereinafter described spring member within said recess during assembly. As indicated by the dotted lines, the socket portion 212 is sized to receive and contain the terminal end portion 220 of a protective fuse member 222 of conventional construction. The inside diameter of the annularly shaped socket portion 212 is preferably sized so as to be slightly larger than the outside diameter of the fuse terminal member 220 so as to assure fuse reception therein, a snug fit for the inserted terminal 220. Maintenance of a compressive and mechanical electrical engagement between the inner surfaces of the wall portions 211 with the inserted portion of the fuse terminal member 220 is materially assisted by inclusion of a split spring ring 224 formed of resilient material, suitable beryllium copper, in the recess 216. As shown in FIGURES 10a and 10b, a preferred construction for the spring ring 224 includes a cylindrically shaped body portion 226 of a thickness sized to be received within the recess 216, a pair of outwardly flared winglike arcuate end portions 228 adapted to extend outwardly from said recess 216 when the body portion is disposed therein and a longitudinally disposed slit 230. In this embodiment no tapering of the spring is required since the engagement of the non-flared end portions with the terminal shoulder 218 serves to retain the spring in the recess.

The cable conductor receiving bore 204 terminates in an outwardly flared portion 232 which in turn terminates in vertically disposed annular shoulder 234 which serves as a stop for the terminal portion 220 of a protective fuse member 222 received within the socket portion 212.

As shown in FIGURE 6, a socket member of the type illustrated in FIGURE 9 and described above is adapted to be contained within each of the connector body housing members X and Y. FIGURE 7 illustrates the preferred configuration of a connector body receptacle housing member X. As there shown, the connector body receptacle housing member includes an elongate cable receiving sleeve portion 240 containing an axially disposed cable receiving bore 242 having a bevelled entry aperture 244. The sleeve portion 240 is preferably of a total length sufficient to contain the cable conductor receiving portion 200 of the heretofore described socket member, a length of insulated cable preferably equal at at least twice the insulated diameter thereof and an additional length to provide the necessary insulation characteristic for a properly prepared cable. The bore 242 is sized to be slightly smaller than the external diameter of the cable employed so as to result in a "distended fit" between the contiguous surfaces of said bore and an insulated cable disposed therewithin. The bore 242 terminates in an outwardly flaring frusto-conically shaped section 246 sized to complementally match and receive the tapered section 208 of the heretofore described socket member. Disposed adjacent to the flared portion 246 is a cylindrically shaped bore 248 sized to complementally match and receive the complementally sized and shaped cylindrical section 210 of the socket member. Positioned to receive the flared end portions 228 of a socket mounted spring member 224 is a spring retaining recess 250. The recess 250 is preferably shaped to provide a pair of perpendicularly disposed surfaces, one of which, i.e., surface 252 is adapted to be disposed substantially perpendicular to the end of the flared portion 228 of the spring member 224 and the other surface 254 thereof is adapted to be disposed substantially perpendicular thereto and in substantially parallel engagement with the outer surface of said flared portion 228. Disposed immediately in advance of the spring retaining recess 250 is a short cylindrical bore 256 of a diameter preferably substantially equal to that of the cylindrical bore 248. The short cylindrical bore 256 terminates in an outwardly flared portion 258, the base of which defines a plug receiving bore portion 260.

FIGURE 8 illustrates the preferred construction of a connector body plug housing member Y. As there shown, the connector body plug housing member includes a reduced diameter section in the form of an elongate sleeve portion 270 containing an axially disposed cable receiving bore 272 provided with a bevelled end 274 to facilitate cable insertion therein. The bore 272 is sized to be of a total length to contain the cable conductor receiving portion 202 of the socket member, a length of insulated cable preferably equal to at least twice the insulated diameter thereof and an additional length to provide the necessary insulation characteristics for a properly prepared cable. The bore 272 is also sized so that the internal diameter thereof is slightly smaller than the external diameter of the cable employed and thereby to result in a "distended fit" with the insulated portions of a cable member inserted therein. The cable receiving bore 272 inwardly terminates in an outwardly flaring frusto-conically shaped section 276 sized to loosely receive the portion 208 of the socket member, and accommodate varying sizes thereof. The adjacent bore 278 and spring retaining recess 280 are shaped and sized so as to be identical with the bore 248, spring retaining recess 254 in the heretofore described connector body receptacle housing member. Disposed adjacent to the recess 280 is a bore 284 of a diameter preferably substantially equal to that of the bore 278 and of a longitudinal extent sufficient to facilitate assembly operations. The bore 284 terminates in an inwardly tapering section 286, the apex dimension of which defines an elongate bore 288 of reduced diameter, at least a portion of which is sized to substantially match the body portion of a fuse member insertable therein and permit the latter to serve as a rigid bore filling base for the hereinafter described plug portions of the housing members. The bore 288 preferably terminates in a slightly beveled end portion 290 to facilitate fuse insertion therein. The terminal portion of the connector body plug housing member, as shown in FIGURE 8, is provided with a vertically disposed shoulder 292 defining both the longitudinal and transverse extent of an adjacently disposed plug portion 294 of reduced external diameter and which terminates in a bevelled end portion 296. The plug portion 294 and its bevelled end 296 are shaped so as to be received within the complementally shaped bore 260 and tapered section 258 which define the receptacle forming portions of the connector body receptacle housing member X. The plug portion 294 is sized so that the outer diameter thereof is slightly greater than the inner diameter of the plug receiving bore 260, so as to effect a "distended fit" therebetween when disposed in assembled relation. The "distended fit" with its concomitant compressive engagement between the contiguous surfaces between the plug and the receptacle materially contributes to the formation and maintenance of a readily separable waterproof seal therebetween.

The material utilized for the connector body plug and receptacle housings X and Y respectively may suitably be of the same general and specific nature as described earlier in conjunction with the embodiment illustrated in FIGURES 1 and 5.

The above described component elements are conveniently individually prefabricated and prepackaged in kit form for ready use in field installation and repair operations. Assembly of the improved connection, as shown in FIGURE 6, is readily accomplished by the following series of manual operations, none of which requires the utilization of special jigs or tools. First, a load side cable end is coated with a lubricant, suitably an insulating jelly, and is inserted into the bevelled end portion 244 of the bore 242 of the connector body receptacle housing and pushed therethrough until the cable end extends through the bore 260. The extending cable end is then skived, the adjacent portion shaped if necessary as described earlier, the bared conductor inserted into the bore 204 of a socket member and the malleable wall portion 202 thereof is crimped or otherwise deformed into secure mechanical and electrical engagement therewith. After coating the outer surface of the socket member with a small amount of lubricating insulating jelly and introducing an additional small amount of said lubricant into the bores 260, 256 and 248, the cable and socket member secured thereto is drawn into the housing member until the tapered portion 208 of the socket member is disposed in abutting engagement against the tapered bore section 246. When so disposed, the flared end portions 228 of the spring 224 will be disposed within the recess 250 and the socket member will be effectively locked in proper position.

A similar procedure is followed with the second or line side cable in conjunction with the connector body plug housing member, as illustrated in FIGURE 8, and a second socket member. When both halves of the connection have been subassembled as described above, the resulting distended fit between the insulated cables and the cable receiving bores 242 and 272 respectively, assures the necessary compressive engagement between the abutting bore and cable surfaces to provide an effective and secure water tight fit therebetween.

With the component elements so assembled, the terminal end portion 220 of a protective fuse 222 is inserted into the terminal receiving socket portion 212 of the socket member disposed within the connector body receptacle housing. After such fuse insertion, the plug portion of the connector body plug housing is inserted into the receptacle portion of the connector body receptacle housing until the end portion 300 of the receptacle housing is disposed in abutting spaced relationship with the shoulder 292 on the plug housing. With the parts so assembled the other terminal portion 220 of the fuse 222 will be positioned within the socket portion 212 of the socket member disposed within the connector body plug member. The compressive engagement of portion of the bore 288 with the fuse body at the junction area provides a rigid base for the "distended fit" between the abutting surfaces of the plug receiving bore 260 and flared portion 258 of the connector body receptacle housing and the plug portion 294 and tapered end portion 296 of the connector body plug housing member. The above recited structure assures the necessary compressive engagement between the abutting plug and receptacle surfaces to provide an effective and secure, although readily releasable, water tight fit therebetween.

As best shown in FIGURE 6, the assembled connector includes a void 302 surrounding a portion of the fuse body disposed within the connector body plug housing member to facilitate insertion of the assembled socket member within the housing, a similar void 308 surrounding a portion of the fuse body disposed within the connector body receptacle housing member, additional voids 304 and 306 disposed adjacent to the vertical shoulder 206 of the socket members and, depending on the sizes of the components, voids surrounding the cable conductor receiving portions of the socket members. These voids, apart from facilitating assembly, are adapted to receive and contain the insulating jelly used for lubricating purposes in the assembly operation and additional jelly to improve the insulation characteristics for high voltage operation and to contribute to the maintenance of a moisture tight assembled unit.

Having thus described our invention, we claim:

1. An electrical connector assembly for effecting a releasable waterproof connection between the insulation stripped end portions of first and second insulated cables comprising an electrical instrumentality having a body portion and a pair of spaced terminal portions at least one of which is of a transverse extent greater than that of said body portion and defines a facing shoulder, a first socket member having a cable conductor engaging end portion electrically and mechanically connected to the insulation stripped end portion of said first cable and an adjacent socket portion releasably containing one of the terminal portions of said electrical instrumentality, a second socket member having a cable conductor engaging end portion electrically and mechanically connected to the insulation stripped end portion of said second cable and an adjacent socket portion releasably containing the other terminal portion of said electrical instrumentality, a first insulating housing member having a continuous axially disposed bore and including a terminal sleeve portion disposed in releasable watertight encircling engagement with the insulated portion of said first cable disposed adjacent the stripped end thereof, an integral body portion sized to complementally enclose said socket portion of said first socket member, and an elongate integral terminal plug portion sized to complementally match and compressively encircle a substantial length of the body portion of said electrical instrumentality and having an internal shoulder disposed in facing relation with the shoulder on said electrical instrumentality, a second insulating housing member having a continuous axially disposed bore and including a terminal sleeve portion disposed in releasable watertight encircling engagement with the insulated portion of said second cable disposed adjacent the stripped end thereof, an integral body portion sized to complementally enclose said socket portion of said second socket member, and an integral terminal receptacle portion sized to complementally receive and engage said terminal plug portion of said first housing member in watertight relation.

2. The connector as set forth in claim 1 wherein said electrical instrumentality is a protective fuse.

3. The connector as set forth in claim 1 wherein said socket portions of said socket members and the socket portion engaging portions of said housing members include complementally shaped means for maintaining said socket members properly positioned within said housing members.

4. The connector as set forth in claim 1 wherein the body portion of said electrical instrumentality provides a rigid base permitting maintenance of a compressive relationship between the abutting contiguous surfaces of said plug and receptacle portions of said housing members.

5. The connector as set forth in claim 1 wherein said plug and receptacle portions of said housing members are sized to provide a distended fit therebetween.

6. The connector as set forth in claim 1 wherein the inside diameter of said cable containing sleeve portions of said housing members is less than the outer diameter of the insulated cable disposed therein.

7. The connector as set forth in claim 1 wherein said socket portions of said socket members have a recessed retaining spring disposed on the outer surface thereof, said retaining spring being provided with an outwardly flaring terminal portion to prevent removal of said spring member and socket member encircled thereby from said housing member after insertion of the same therein.

8. An electrical connector assembly for effecting a releasable waterproof connection between the end portions of first and second insulated cables with an electrical instrumentality having a body portion and a pair of spaced terminal portions one of which is of a transverse extent greater than that of said body portion and defines a facing shoulder, a first socket member having a cable conductor engaging end portion adapted to be electrically and mechanically connected to an insulation stripped end portion of said first cable and an adjacent socket portion sized to contain one of the terminal end portions of said electrical instrumentality, a second socket member having a cable conductor engaging end portion adapted to be electrically and mechanically connected to an insulation stripped end portion of said second cable and an adjacent socket portion sized to contain the other terminal end portion of said electrical instrumentality, a first housing member having a continuous axially disposed bore and including a terminal sleeve portion sized to releasably engage the insulated portion of said first cable disposed adjacent the stripped end portion thereof in watertight relation, an integral body portion sized and shaped to complementally contain the socket portion of said first socket member and an elongate integral terminal plug portion sized to complementally match and compressively encircle a substantial length of the body portion of said electrical instrumentality and having an internal shoulder disposed in facing relation with the shoulder on said electrical instrumentality, a second housing member having a terminal sleeve portion sized and shaped to releasably engage the insulated portion of said second cable disposed adjacent the stripped end portion thereof in watertight relation, an integral body portion sized and shaped to complementally contain the socket portion of said second socket member and an integral receptacle portion sized to complementally receive and engage said terminal plug portion of said first housing member in watertight relation.

9. The connector as set forth in claim 8 wherein said electrical instrumentality is a protective fuse.

10. The connector as set forth in claim 1 wherein said housing members are formed of resilient and elastic material.

11. The connector as set forth in claim 1 wherein said housing members are formed of resilient and elastic material and provide a substantially shock and vibration free mount for the instrumentality enclosed thereby.

12. Means for effecting a releasable waterproof connection between the end portion of each of first and second insulated cables and a fuse having a body portion and a pair of spaced terminal portions one of which is of a transverse extent greater than that of said body portion and defines a facing shoulder, said means comprising a first socket member having a cable conductor engaging end portion adapted to be electrically and mechanically connected to an insulation stripped end portion of said first cable and an adjacent socket portion sized to contain one of the terminal end portions of said fuse, a second socket member having a cable conductor engaging end portion adapted to be electrically and mechanically connected to an insulation stripped end portion of said second cable and an adjacent socket portion sized to contain the other terminal end portion of said fuse, a first housing member having a continuous axially disposed bore and including a terminal sleeve portion sized to releasably engage the insulated portion of said first cable disposed adjacent the stripped end portion thereof in watertight relation, an integral body portion sized and shaped to complementally contain the socket portion of said first socket member and an elongate integral terminal plug portion sized to complementally match and compressively encircle a substantial length of the body portion of said fuse and having an internal shoulder adapted to be disposed in facing relation with the shoulder on said fuse, a second housing member having a terminal sleeve portion sized and shaped to releasably engage the insulated portion of said second cable disposed adjacent the stripped end portion thereof in watertight relation, an integral body portion sized and shaped to complementally contain the socket portion of said second socket member and an integral receptacle portion sized to complementally receive and engage said terminal plug portion of said first housing member in watertight relation.

References Cited in the file of this patent

UNITED STATES PATENTS

| | | |
|---|---|---|
| 2,037,630 | Hudson | Apr. 14, 1936 |
| 2,700,085 | Breisch et al. | Jan. 18, 1955 |
| 2,758,291 | Richards | Aug. 7, 1956 |
| 2,782,391 | Kirk | Feb. 19, 1957 |
| 2,785,319 | Simpson et al. | Mar. 12, 1957 |
| 2,802,920 | Kinnear | Aug. 13, 1957 |
| 2,831,087 | Sundt | Apr. 15, 1958 |
| 2,839,636 | Brown | June 17, 1958 |